US006836896B2

(12) United States Patent
    Shin (10) Patent No.: US 6,836,896 B2
(45) Date of Patent: Dec. 28, 2004

(54) CLAMP DRIVING DEVICE OF COMPACT DISK PLAYER FOR AUTOMOBILE

(75) Inventor: Soon-Yong Shin, Suwon-si (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 302 days.

(21) Appl. No.: 10/145,895

(22) Filed: May 16, 2002

(65) Prior Publication Data

US 2003/0161242 A1 Aug. 28, 2003

(30) Foreign Application Priority Data

Feb. 25, 2002 (KR) .......................................... 2002-9976

(51) Int. Cl.[7] .............................................. G11B 33/02
(52) U.S. Cl. ..................................................... 720/713
(58) Field of Search ............................. 369/75.1, 77.2, 369/270, 77.1, 75.2; 720/713

(56) References Cited

U.S. PATENT DOCUMENTS

| | | | | |
|---|---|---|---|---|
| 5,901,130 A | * | 5/1999 | Fukuyama et al. | 369/77.2 |
| 6,044,054 A | * | 3/2000 | Shiomi | 369/77.1 |
| 6,246,643 B1 | * | 6/2001 | Satoh et al. | 369/30.85 |
| 6,275,465 B1 | * | 8/2001 | Shirashima et al. | 369/270 |
| 6,512,730 B1 | * | 1/2003 | Lee et al. | 369/77.1 |
| 2002/0018427 A1 | * | 2/2002 | Hino et al. | 369/77.1 |

* cited by examiner

Primary Examiner—David Ometz
Assistant Examiner—Mark Blouin
(74) Attorney, Agent, or Firm—Morgan, Lewis & Bockius LLP (57) ABSTRACT

A clamp driving device of a compact disk player for an automobile is disclosed. When a disk is loaded and moved to the center of a turntable, a selective arm is rotated by the loaded disk and thus a sensor lever is moved forwardly. A checking piece of the sensor lever is disengaged from a hook piece of an idle arm, and the idle arm is rotated upwardly, thereby raising an idle gear. The idle gear is engaged with a cam gear to rotate the cam gear. A transmission bar transmits the turning force of the cam gear to a locking lever to move the locking lever forwardly. By the forward movement of the locking lever, a supporting pin of the locking lever is separated from a clamp arm, and thus the clamp arm is lowered by a spring. The disk is pressed at its upper surface by the clamp, thereby preventing deviation of the disk. The device can fulfill all clamping operations by mechanical components and without using electrical components. Therefore, the device can achieve excellent operational performance, minimize of operational errors, improved reliability of products, and lower manufacturing cost.

13 Claims, 7 Drawing Sheets

CLAMP DRIVING DEVICE OF COMPACT DISK PLAYER FOR AUTOMOBILE

BACKGROUND OF THE INVENTION

1. Field of the Invention

The present invention relates to a compact disk player for an automobile, and more particularly to a clamp driving device of a compact disk player for an automobile, which is intended to achieve an operation of detecting a disk seated on a turntable and clamping the disk by a mechanical mechanism rather than by a sensor and a solenoid, thereby improving operational reliability.

2. Description of the Prior Art

In general, a compact disk player for an automobile is an appliance for playing back data recorded on a compact disk by an optical system.

Such a compact disk player for an automobile comprises a turntable on which a disk is placed, a loading unit for pulling in a disk inserted into an insertion slot and for seating the disk on the turntable, a drive for rotating the turntable, a clamping unit for preventing shifting of the disk during rotation of the turntable, an optical pick up for writing data on a disk and reading data from the disk while radially moving on the disk, and a disk drive for moving the disk back and forth.

Figure 1:
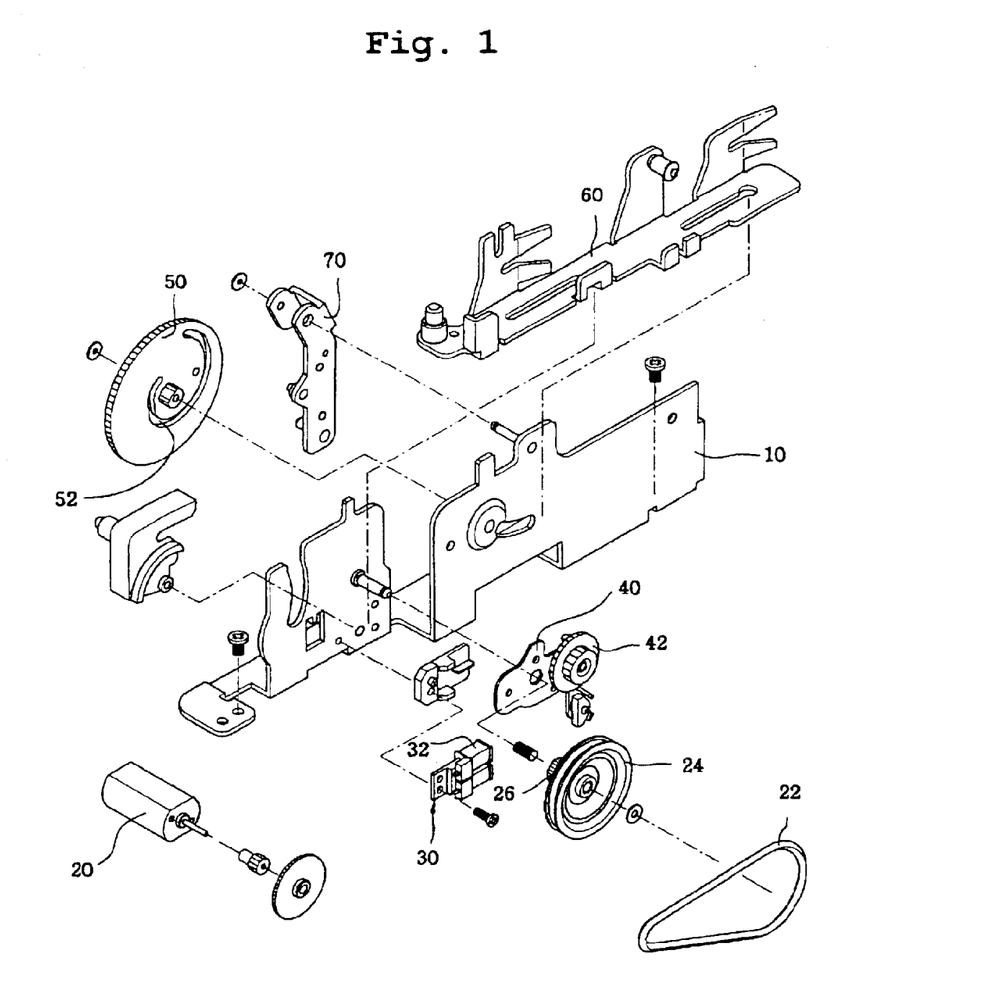
FIG. 1 is an exploded perspective view of a conventional clamp driving device of a compact disk player for an automobile.
Figure 2:
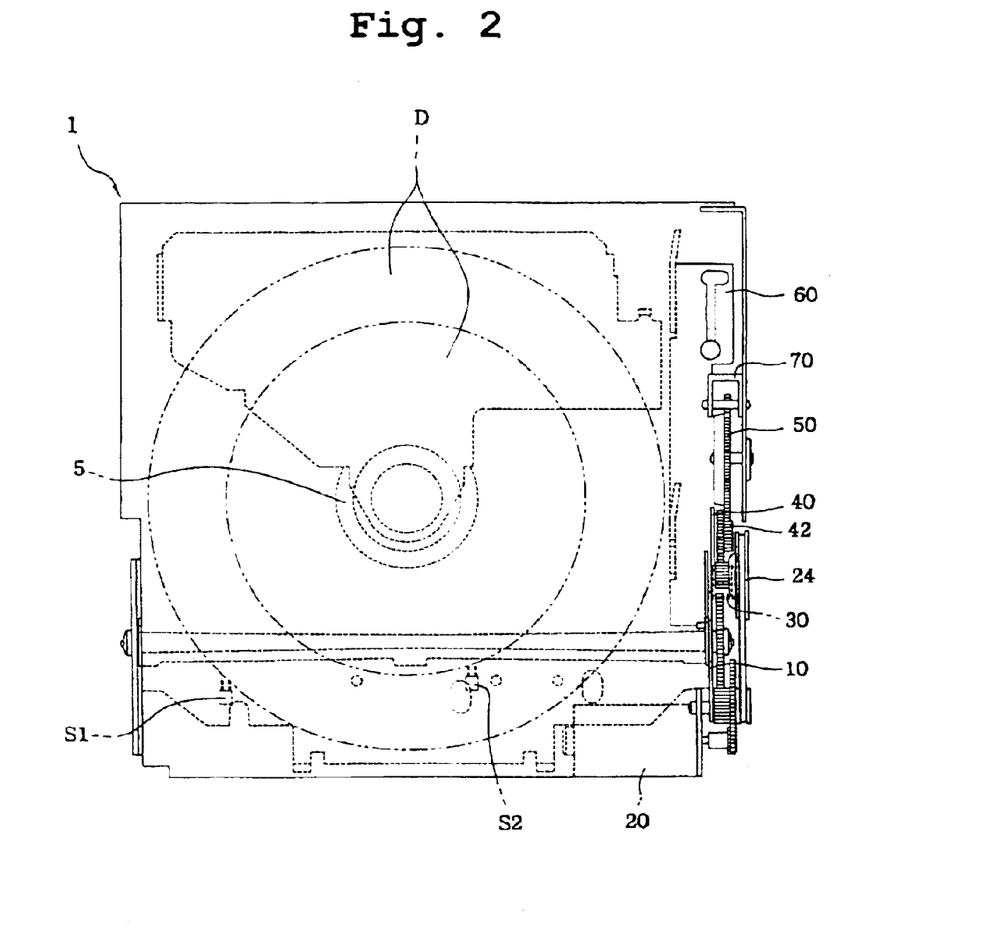
FIG. 2 is a plan view of a compact disk player to which the conventional clamp driving device of a compact disk player for an automobile is applied.
Figure 3:
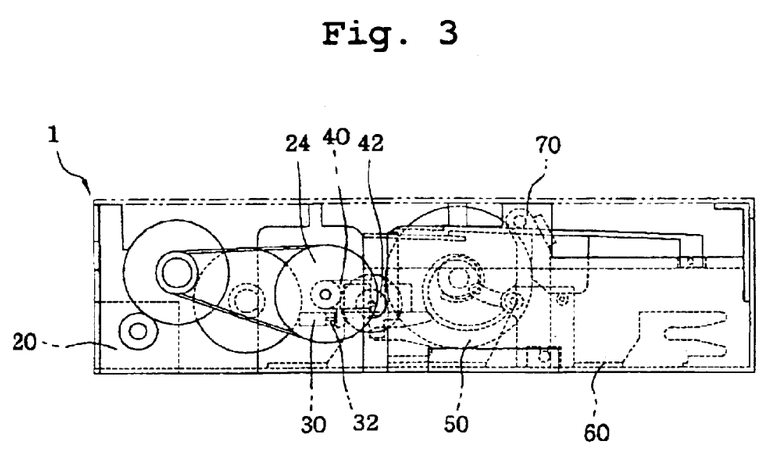
FIG. 3 is a side view of the conventional clamp driving device of a compact disk player for an automobile.

FIGS. 1 to 3 show a conventional clamp driving device of a compact disk player for an automobile which is operated to lower a clamp thus pressing a disk immediately after the disk inserted into a player body, is seated on a turntable.

As shown in the drawings, such a conventional clamp driving device comprises a pulley 24 coupled to a side frame 10 of a player body 1, which is rotated by a driving motor 20 via a belt 22 and is provided at its inner surface with a gear part 26 integrally formed thereat, a solenoid 30 with a rod 32 adapted to be extended when detecting a disk "D" centrally positioned at a turntable 3, an idle arm 40 adapted to be selectively rotated by an operation of the solenoid 30, an idle gear 42 coupled to the idle arm and adapted to be engaged with the gear part 26 of the pulley 24 when the idle arm 40 is rotated, a cam gear 50 engaged with the idle gear and having a cam groove 52 at its side, a locking lever 60 coupled to a bottom frame of the player body 1 and selectively checking lowering of a clamp 5 while moving back and forth, and a power transmission bar 70 connecting the cam gear 50 and the locking lever 60 and causing linear movement of the locking lever 60 while moving along the cam groove 52 of the cam gear 50.

The solenoid is activated by detecting a disk "D" centrally positioned at the turntable 3 by a first sensor "S1" for detecting an 120 mm disk and a second sensor "S2" for detecting an 80 mm disk which are provided in the player body.

In the conventional clamp driving device of a compact disk player, when a disk "D" is centrally positioned at the turntable 3, the sensor "S1" and "S2" detects the disk and activates the solenoid 30. When the solenoid is operated to extend the rod 32, the rod 32 presses a part of the idle arm 40. The idle arm 40 is rotated and raised about its axis by the pressing force of the rod 32 and thus the idle gear 42 is raised and the gear part 26 of the pulley 24 and the cam gear 50 is engaged by rise of the idle gear 42. The cam gear 50 is rotated by turning force of the pulley 24, and the turning force of the cam gear 50 is transmitted to the locking lever 60 via the power transmission bar 70 thus moves the locking lever 60 forwardly. By the forward movement of the locking lever, the clamp 5 is released from the locking lever and then lowered to clamp a disk.

Since the conventional clamp driving device is operated by an electrical mechanism and a mechanical mechanism, operational performance is lowered. Furthermore, since operation errors caused by an electrical signal are frequently generated, reliability of products is lowered.

In addition, since electrical components and mechanical components must be taken into account when the device is assembled, assembling efficiency and productivity are lowered. Moreover, since the device uses expensive electrical components, manufacturing cost is high.

SUMMARY OF THE INVENTION

Accordingly, the present invention has been made keeping in mind the above problems occurring in the prior art, and an object of the present invention is to provide a clamp driving device of a compact disk player for an automobile which is intended to achieve all operations of clamping a disk by a mechanical mechanism, thereby achieving improvement of assembling efficiency and operational performance and lowering of manufacturing cost.

In order to accomplish the above object, the present invention provides a clamp driving device of a compact disk player for an automobile comprising: a player body which is provided therein with a turntable on which a disk is seated, and provided with a driving motor; a clamp arm provided in the player body, which is hingedly connected at its rear portion to the player body and provided at its front portion with a clamp for selectively pressing an upper surface of a disk; a sensor lever coupled to an upper frame of the player body to be moved back and forth, which is biased rearwardly by a lever spring; a locking lever coupled to a lower frame of the player body to be linearly moved back and forth and adapted to selectively check lowering of the clamp arm; a first power transmission mechanism provided at a side frame of the player body, and adapted to selectively transmit turning force of the driving motor by actuation of the sensor lever; and a second power transmission mechanism provided at the side frame of the player body, and adapted to selectively convert the rotational movement of the first power transmission mechanism into linear movement of the locking lever.

The first power transmission mechanism may comprise; a pulley coupled to a central shaft provided at the side frame, and adapted to be rotated by the turning force of the driving motor, the pulley including a gear part at its inner side; an idle arm coupled to the central shaft inside the pulley and adapted to be rotated together with the pulley by frictional force, the idle arm including at its upper portion a hook piece extended upwardly; and an idle gear provided adjacent to the idle arm to be moved therewith, and engaged with the gear part of the pulley to be moved therewith.

The second power transmission mechanism may comprise: a cam gear adapted to be rotated by turning force of the first power transmission mechanism, and including at its side a cam groove; and a power transmission bar rotatably coupled at its upper portion to the side frame, which is provided at its middle portion with a guide pin inserted in the cam groove and moved therealong and is coupled at its lower portion to the locking lever.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

This invention will be described in further detail by way of example with reference to the accompanying drawings.

Figure 4:
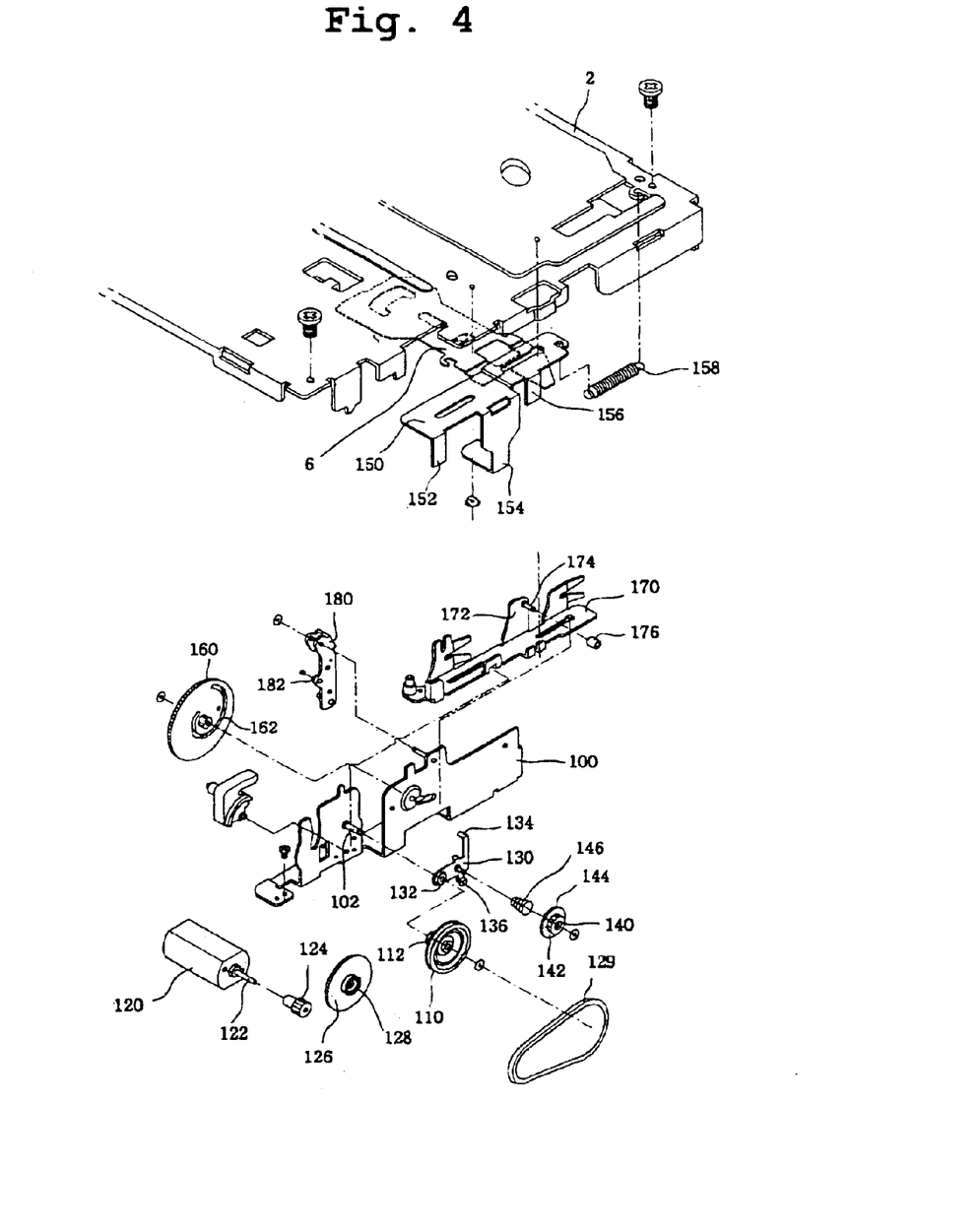
FIG. 4 is an exploded perspective view of a clamp driving device of a compact disk player for an automobile according to the present invention.
Figure 5:
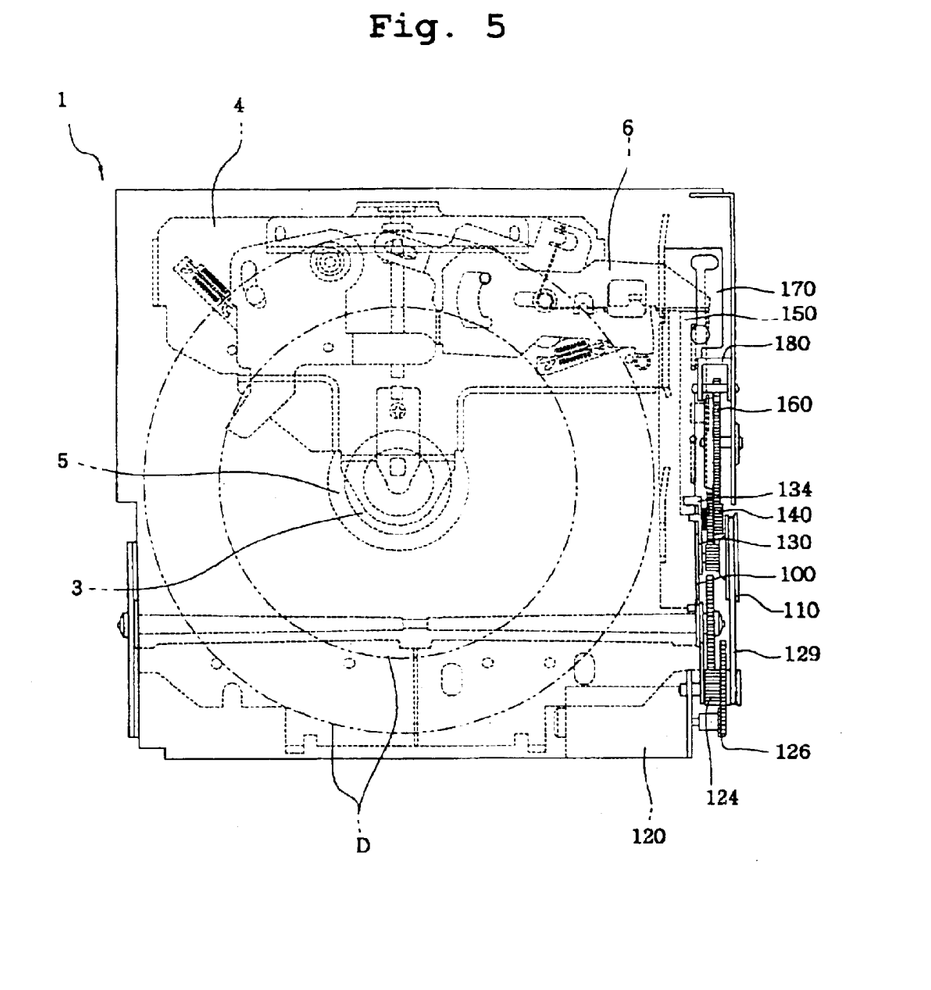
FIG. 5 is a plan view of the compact disk player to which the clamp driving device according to the present invention is applied.
Figure 6:
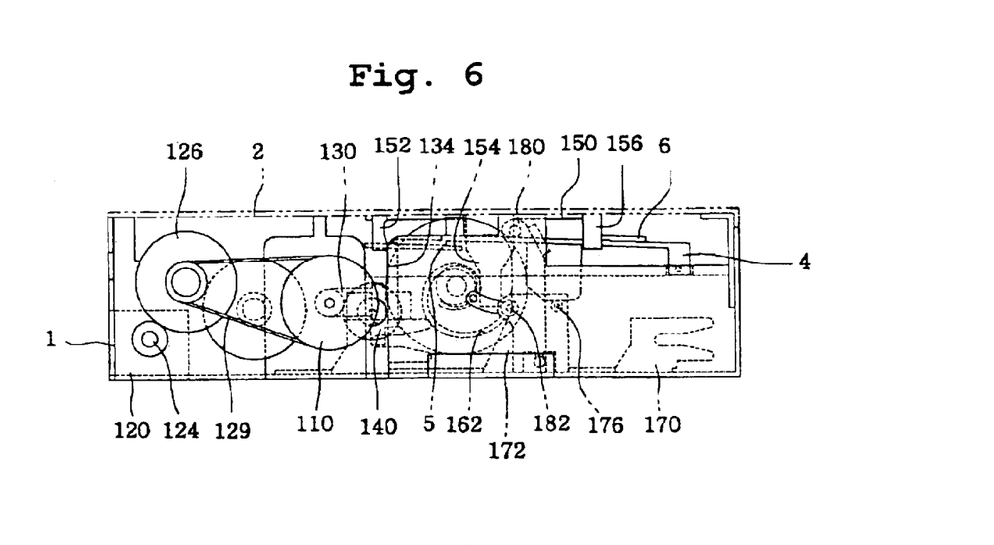
FIG. 6 is a side view of the clamp driving device according to the present invention.

As shown in FIGS. 4 to 6, a player body 1 is detachably assembled with an upper frame 2, and is provided therein with a turntable 3 on which a disk "D" is seated. The upper frame 2 is also provided at its side with a driving motor 120.

Moreover, the player body 1 is provided therein with a clamp arm 4, which is hingedly connected at its rear end, and provided at a front of the clamp arm with a clamp 5, which is adapted to selectively press an upper surface of a disk.

A spring is disposed between the clamp arm 4 and the player body 1 to bias the clamp arm 4 downwardly.

The clamp arm is attached at its upper surface with a selective arm 6, such that the selective arm 6 is rotated about its axis when a disk "D" is loaded and thus comes into contact with a part of the selective arm.

A side frame 100 of the player body is provided with a first power transmission mechanism for selectively transmitting turning force of the driving motor by a later-described sensor. lever 150, and a second power transmission mechanism for converting the turning force of the first transmission mechanism into linear force of a later-described locking lever 170.

The first transmission mechanism is composed of a pulley 110, a idle arm 130 and a idle gear 140 and the second transmission mechanism is composed of a cam gear 160 and a transmission bar 180.

A pulley 110 is coupled to a central shaft 102 attached to the side frame 100 of the player body 1 to be rotated by turning force of the driving motor 120.

More specifically, a motor shaft 122 of the driving motor 120 mounted on the player body 1 is provided with a driving gear 124 fixedly secured thereto. The driving gear 124 is engaged with a follower gear 126 of a loading device to rotate the follower gear 126. The follower gear 126 is integrally formed at its side with a driving pulley 128, which is connected to the pulley 110 via a belt 129 to transmit turning force of the driving motor 120 to the pulley 110.

The pulley 110 is integrally provided at its inner side with a gear part 112 protruding inwardly.

An idle arm 130 is rotatably coupled to the central shaft 102 such that the idle arm 130 is disposed between the side frame 100 and the pulley 110. Between the pulley 110 and the idle arm 130 is disposed a bush 132.

The idle arm 130 is provided at its upper end with a hook piece 134 protruding upwardly, and provided at its side with a connecting pin 136. The idle gear 140 is rotatably coupled to the connecting pin 136, so that, when the idle arm 130 is rotated about the central shaft 102, the idle gear 140 is rotated up and down together with the idle arm 130.

The idle gear 140 comprises a first gear part 142 to be engaged with a later-described cam gear 160, and a second gear part 144 to be selectively engaged with the gear part 112 of the pulley 110.

The connecting pin 136 is provided with a spring 146 such that the spring 146 is disposed between the idle arm 130 and the idle gear 140, thereby elastically supporting the idle gear 140.

The upper frame 2 of the player body 1 is provided at its lower surface with a sensor lever 150 to be linearly moved back and forth.

The sensor lever 150 is provided at its front end with a checking piece 152, which is bent and extended downwardly and comes into contact with the hook piece 134 of the idle arm 130 to check rotation of the idle arm 130. Furthermore, the sensor lever 150 is provided at its middle portion with a first contact piece 154 extended downwardly, and provided at its rear portion with a second contact piece 156, which is extended downwardly and comes into contact with the selective arm 6 to allowing it to be moved forwardly when the selective arm 6 is rotated by a loaded disk "D".

A lever spring 158 connects the sensor lever 150 and the upper frame 2 so as to bias the sensor lever 150 rearwardly.

The side frame 100 of the player body 1 is provided with the cam gear 160, which is selectively engaged with the idle gear 140. The cam gear 160 is formed with a cam groove 162 at its side.

A lower frame of the player body 1 is provided with the locking lever 170 to be moved linearly back and forth.

The locking lever 170 is provided with a press piece 172, which is adapted to press the first contact piece 154 of the sensor lever 150 when the locking lever 170 is moved forwardly. The press piece 172 includes a supporting pin 174 extended laterally, which selectively prevents the clamp arm from being rotated downwardly by supporting a part of the clamp arm 4. A roller 176 is rotatably coupled to the supporting pin 174.

The cam gear 160 and the locking lever 170 are connected to each other by a transmission bar 180. By the transmission bar 180, turning force of the cam gear 160 is converted into linear force of the locking lever 170.

The transmission bar 180 is coupled at its upper portion to the side frame 100, and provided at its middle portion with a guide pin 182 which is engaged in the cam groove 162 of the cam gear 160 and guided therealong. A lower portion of the transmission bar 180 is connected to the locking lever 170 to be moved up and down. Accordingly, when the cam gear 160 is rotated, the guide pin 182 is moved along the cam groove 162 so that the transmission bar 180 is rotated about its upper portion to move the locking lever 170.

Functions of the clamp driving device according to the present invention will now be described.

When electrical power is applied to the device, the driving motor 120 is activated. Turning force of the driving motor is transmitted to the pulley 110 via the belt 129 and causes the pulley 110 to be rotated. By the rotation of the pulley 110, the idle gear 140, which is engaged with the pulley 110, is rotated.

Figure 7A:
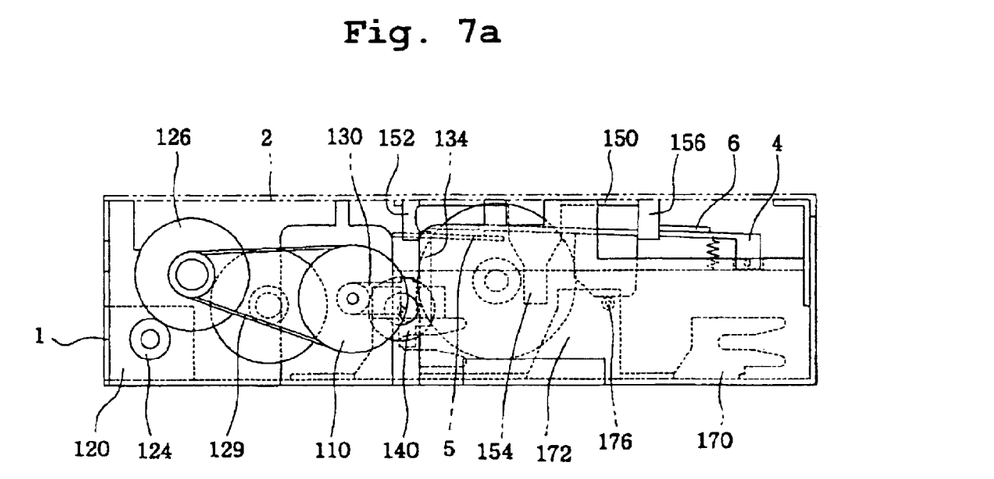
FIG. 7a to FIG. 7c are operation view of the present invention.

As shown in FIG. 7a, since the hook piece 134 of the idle arm 130 is engaged with the checking piece 152 of the sensor lever 150, the idle arm 130 is not rotated. Therefore, the idle gear 140 is rotated without engagement with the cam gear 160.

Figure 7B:
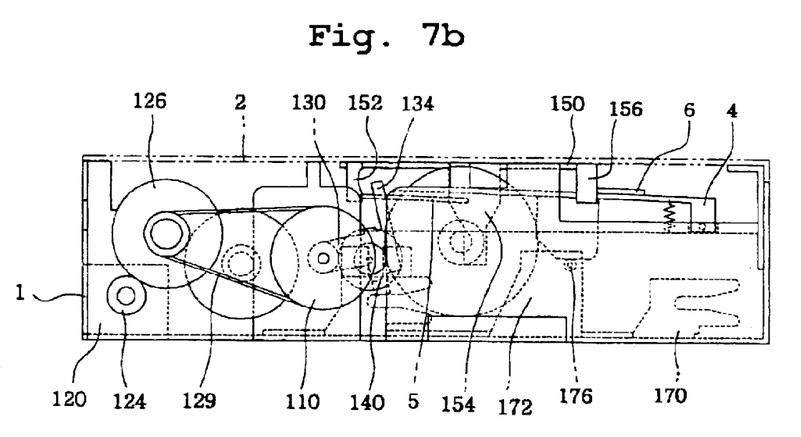

In this condition, when a disk "D" is inserted into the player body and guided to the center of the turntable 3, the disk "D" collides with a part of the selective arm 6. By this collision, the selective arm 6 is rotated and thus an outer end of the selective arm presses the second contact piece 156, thereby moving the sensor lever forwardly, as shown in FIG. 7b.

Subsequently, the checking piece 152 of the sensor lever 150 is disengaged from the hook piece 134 of the idle arm 130, and the idle arm 130 is rotated upwardly by frictional force between the pulley 110 and the idle arm 130. At this point, the idle gear 140 coupled to the idle arm 130 is also raised and then engaged with the cam gear 160.

As the cam gear 160 is rotated, the guide pin 182 of the transmission bar 180 is moved along the cam groove 162 so that the transmission bar 180 is rotated about its upper portion, thereby causing the locking lever 170 to be moved forwardly.

Figure 7C:
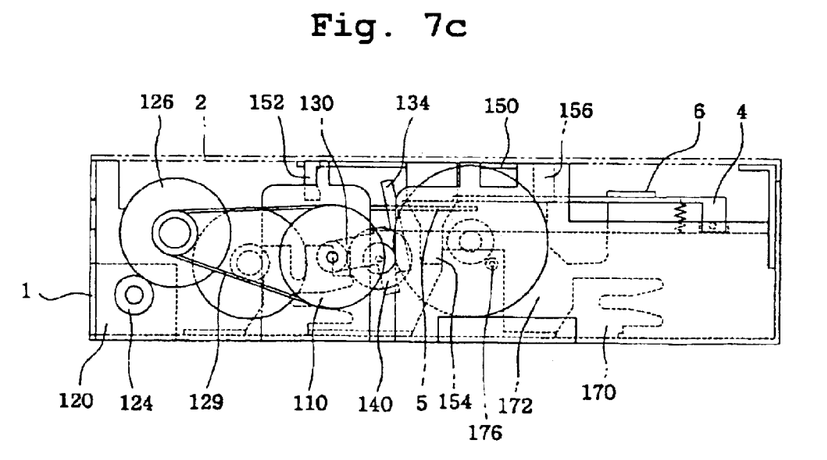

When the locking lever 170 is moved forwardly, the supporting pin 174 supporting the clamp arm 4 is moved forwardly while rolling a roller 176, and is separated from the clamp arm 4, as shown in FIG. 7c. By this separation, the clamp arm 4 is rotated downwardly by restoring force of the spring, and the lowering of the clamp 5 causes the disk "D" to be pressed preventing deviation of the disk "D".

On the contrary, when the clamp 5 is raised to eject the disk "D", the motor shaft 122 of the driving motor 120 is reversely rotated.

Thereafter, the components constituting the clamp driving device of the present invention are operated in an order opposite to the above-described operation. Accordingly, the locking lever 170 is moved backwardly, and the supporting pin 174 is moved and guided by the roller 176, thereby raising the clamp arm 4.

As such, since the clamp driving device according to the present invention does not use electrical components such as sensors and solenoids as in the prior art but instead uses mechanical components to drive the clamp 5 up and down, product performance is enhanced through excellent operational performance and there is a minimization of operational errors.

Furthermore, since the clamp driving device of the present invention does not use expensive electrical components, its manufacturing cost is lowered and consumption of electrical power is decreased.

In addition, since all the components of the device are mechanically assembled, assembling performance and productivity are enhanced.

As described above, the present invention provides a clamp driving device of a compact disk player for an automobile, which is capable of fulfilling a clamping operation by mechanical components without electrical components. Therefore, the clamp driving device according to the present invention can achieve excellent operational performance, minimize operational errors and improved reliability of products. In addition, since the device of the present invention does not use expensive electrical components, manufacturing cost is lowered.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A clamp driving device of a compact disk player for an automobile comprising:
   a player body which is provided therein with a turntable on which a disk is seated, and provided with a driving motor;
   a clamp arm provided in the player body, which is hingedly connected at its rear portion to the player body and provided at its front portion with a clamp for selectively pressing an upper surface of a disk;
   a sensor lever coupled to an upper frame of the player body to be moved back and forth, which is biased rearwardly by a lever spring;
   a locking lever coupled to a lower frame of the player body to be linearly moved back and forth and adapted to selectively check lowering of the clamp arm;
   a first power transmission mechanism provided at a side frame of the player body, and adapted to selectively transmit turning force of the driving motor by actuation of the sensor lever; and
   a second power transmission mechanism provided at the side frame of the player body, and adapted to selectively convert the rotational movement of the first power transmission mechanism into linear movement of the locking lever,
   wherein the clamp arm is coupled under a selective arm and is adapted to be rotated when a disk is loaded, and the sensor lever being provided at its rear portion with a second contact piece to be in contact with the selective arm so that the second contact piece is pushed by the rotating selective arm to move the sensor lever forwardly.

2. The clamp driving device as set forth in claim 1, in which the first power transmission mechanism comprises:
   a pulley coupled to a central shaft provided at the side frame, and adapted to be rotated by the turning force of the driving motor, the pulley including a gear part at its inner side;
   an idle arm coupled to the central shaft inside the pulley and adapted to be rotated together with the pulley by frictional force, the idle arm including at its upper portion a hook piece extended upwardly; and
   an idle gear provided adjacent to the idle arm to be moved therewith, and engaged with the gear part of the pulley to be moved therewith.

3. The clamp driving device as set forth in claim 2, in which a spring is disposed between the idle aim and the idle gear to bias the idle gear.

4. The clamp driving device as set forth in claim 2, in which the sensor lever is provided at its front portion with a checking piece extended downwardly, which is adapted to come into contact with the hook piece of the idle arm to prevent rotation of the idle arm.

5. The clamp driving device as set forth in claim 1, in which the second power transmission mechanism comprises:
   a cam gear adapted to be rotated by turning force of the first power transmission mechanism, and including at its side a cam groove; and
   a power transmission bar rotatably coupled at its upper portion to the side frame, which is provided at its middle portion with a guide pin inserted in the cam groove and moved therealong and is coupled at its lower portion to the locking lever.

6. The clamp driving device as set forth in claim 1, in which the sensor lever is provided at its middle portion with a first contact piece extended downwardly, and the locking lever is provided with a press piece adapted to press the first contact piece when being moved forwardly, the press piece including a supporting pin for preventing lowering of the clamp arm by supporting a part of the clamp arm.

7. The clamp driving device as set forth in claim 6, in which the supporting pin of the locking lever is provided with a roller rotatably coupled thereto.

8. A clamp driving device of a compact disk player for an automobile comprising:

- a player body which is provided therein with a turntable on which a disk is seated, and provided with a driving motor;
- a clamp arm provided in the player body, which is hingedly connected at its rear portion to the player body and provided at its front portion with a clamp for selectively pressing an upper surface of a disk;
- a sensor lever coupled to an upper frame of the player body to be moved back and forth, which is biased rearwardly by a lever spring;
- a locking lever coupled to a lower frame of the player body to be linearly moved back and forth and adapted to selectively check lowering of the clamp arm;
- a first power transmission mechanism provided at a side frame of the slaver body, and adapted to selectively transmit turning force of the driving motor by actuation of the sensor lever; and
- a second power transmission mechanism provided at the side frame of the player body, and adapted to selectively convert the rotational movement of the first power transmission mechanism into linear movement of the locking lever, in which the sensor lever is provided at its middle portion with a first contact piece extended downwardly, and the locking lever is provided with a press piece adapted to press the first contact piece when being moved forwardly, the press piece including a supporting pin for preventing lowering of the clamp arm by supporting a part of the clamp arm.

9. The clamp driving device as set forth in claim 8, in which the supporting pin of the locking lever is provided with a roller rotatably coupled thereto.

10. A clamp driving device of a compact disk player for an automobile comprising:

- a player body which is provided therein with a turntable on which a disk is seated, and provided with a driving motor;
- a clamp arm provided in the player body, which is hingedly connected at its rear portion to the player body and provided at its front portion with a clamp for selectively pressing an upper surface of a disk;
- a pulley coupled to a central shaft provided at the side frame, and adapted to be rotated by the turning force of the driving motor, the pulley including a gear part at its inner side;
- an idle gear engaged with the gear part of the pulley;
- an idle arm rotatably coupled to the central shaft, which is provided at its upper portion with a hook piece extended upwardly and provided at its side with the idle gear to be rotated;
- a sensor lever coupled to an upper frame of the player body to be moved linearly, which is provided at its front portion with a checking piece for preventing rotation of the idle arm by coming into contact with the hook piece of the idle arm, and provided at its middle portion with a contact piece extended downwardly, the sensor lever is biased rearwardly by a spring connected between the upper frame and the sensor lever;
- a cam gear coupled to the side frame of the player body and adapted to be selectively engaged with the idle gear, the cam gear including at its side a cam groove;
- a locking lever provided at a lower frame of the player body to be linearly moved back and forth, and provided with a press piece for pushing the contact piece of the sensor lever when being moved forwardly, the press piece including a supporting pin for selectively checking downward rotation of the clamp arm by supporting a part of the clamp arm; and
- a power transmission bar rotatably coupled at its upper portion to the side frame, which is provided at its middle portion with a guide pin inserted in the cam groove and is coupled at its lower portion to the locking lever to convert rotational movement of the cam gear into linear movement of the locking lever.

11. The clamp driving device as set forth in claim 10, in which the clamp arm is hingedly connected at its rear portion to the player body to selectively move the clamp up and down and is coupled under a selective arm, the clamp arm being adapted so as to rotate when a disk is loaded, and the sensor lever being provided at its rear portion with a second contact piece to be in contact with the selective arm so that the second contact piece is pushed by the rotating selective arm to move the sensor lever forwardly.

12. The clamp driving device as set forth in claim 10, in which the supporting pin of the locking lever is provided with a roller rotatably coupled thereto.

13. The clamp driving device as set forth in claim 10, in which a spring is disposed between the idle arm and the idle gear to bias the idle gear.

* * * * *